US005893697A

United States Patent [19]

Zini et al.

[11] Patent Number: 5,893,697

[45] Date of Patent: Apr. 13, 1999

[54] AUTOMATED SYSTEM FOR SELECTING PACKAGES FROM A STORAGE AREA

[75] Inventors: Aldo Zini, Pittsburgh; Manoj K. Wangu, Wexford; Sean C. McDonald, Pittsburgh, all of Pa.

[73] Assignee: Automated Healthcare, Inc., Pittsburgh, Pa.

[21] Appl. No.: 08/825,003

[22] Filed: Mar. 26, 1997

[51] Int. Cl.$^{6}$ .......................... B65G 59/00; B65G 65/00

[52] U.S. Cl. ...................... 414/273; 221/289; 221/312 R; 193/46; 193/34

[58] Field of Search ............................ 221/289, 312 R, 221/297, 298, 299; 193/46, 33, 34; 414/280, 281, 273, 277

[56] References Cited

U.S. PATENT DOCUMENTS

| | | | |
|---|---|---|---|
| 2,994,458 | 8/1961 | Rise et al. | 221/312 R |
| 3,099,359 | 7/1963 | Taylor | 221/312 R |
| 3,306,688 | 2/1967 | Domenico | 221/312 R |
| 3,410,453 | 11/1968 | Lawrence | 221/298 |
| 3,917,045 | 11/1975 | Williams et al. | 221/71 |
| 4,546,901 | 10/1985 | Buttarazzi | 210/10 |
| 4,669,047 | 5/1987 | Chucta | 364/468 |
| 4,708,261 | 11/1987 | Sinocchi | 221/289 |
| 4,896,024 | 1/1990 | Morello et al. | 235/381 |
| 4,917,264 | 4/1990 | Gasiel et al. | 221/312 R |
| 5,080,256 | 1/1992 | Rockola | 221/312 R |
| 5,111,965 | 5/1992 | Allen et al. | 221/299 |
| 5,263,596 | 11/1993 | Williams | 221/289 |
| 5,462,198 | 10/1995 | Schwimmer | 221/289 |
| 5,468,110 | 11/1995 | McDonald et al. | 414/273 |
| 5,582,326 | 12/1996 | Nishimura | 221/312 R |

*Primary Examiner*—Karen M. Young
*Assistant Examiner*—Douglas Hess
*Attorney, Agent, or Firm*—Buchanan Ingersoll

[57] ABSTRACT

A package dispenser that can be used in an automated system for filling orders, such as prescriptions for patients. The dispenser includes a magazine for holding a plurality of packages. The magazine includes a loading end and a dispensing end which has a releasable retainer to keep the loaded packages in the magazine until they are released. Several dispensers may be combined with an automated storage system in which a robot selects packages from storage racks. Then, packages can be simultaneously delivered by the dispensers and the robot. The dispensers may be filled by the robot. The robot and releasable retainer in the dispenser are computer controlled.

12 Claims, 2 Drawing Sheets

AUTOMATED SYSTEM FOR SELECTING PACKAGES FROM A STORAGE AREA

BACKGROUND OF THE INVENTION

1. Field of the Invention

The present invention relates to automated systems for selecting and restocking stored articles and specifically to an automated system for filling prescriptions and restocking medicines in a pharmacy.

2. Description of Related Art

Many industries store products or parts in a storeroom or storage area and repeatedly select some of the stored items to fill orders or for other uses. Such items may range from small electronic components used by a manufacturer of electronic devices to automotive parts, which vary in size, used by service departments of automobile dealerships. Usually one or more people are employed to retrieve the requested items and to restock new and returned items. These individuals may also be required to confirm that the requested items are compatible with one another and with previously supplied items. If the supplied items are to be billed to a customer or charged to particular internal accounts, the list of items is first written by the requester, and rewritten or entered into a computer database by the storeroom attendant to create an invoice, supply list or other document. In some instances, further generations of the list are made by installers, users or billing clerks. Such methods have built-in opportunities for mistakes every time a list is rewritten and are less efficient than automated systems. Moreover, as labor costs rise and the size of inventory needed to be stored expands, the conventional storeroom and parts department become more and more expensive.

Blister packages are commonly used as containers for a wide variety of products. This type of package consists of a rectangular piece of cardboard on which the product is placed and a plastic blister which surrounds all exposed sides of the product and is affixed to the front face of the cardboard. Most blister cards have a hole for hanging the package on a storage rack. Blister packages are often used as containers for a single item that is used at one time. Single doses of medicine are individually packaged for hospital use on blister cards creating a unit dose package.

Currently, in large hospital environments, doctors visit patients in nursing modules and write out medication orders for each patient. Most patients are placed on medication which must be administered several times over a period of a day. Some patients are given several different medicines which are administered at different time intervals during the day. Patients may also request certain medications on an elective basis for disorders such as headaches. Furthermore, some medicines are taken more frequently than other medicines, and some medicines are prescribed more frequently. All of the prescribed medication for all of the patients are supplied by the hospital pharmacy in accordance with the doctor's orders.

Once an order is received by the pharmacy, it is checked by registered pharmacists and input into the pharmacy information system. The pharmacy information system combines this information with the patient's existing medication schedule and develops a patient medication profile. A list is generated for each patient which contains all the medications that must be given to that patient during each day or other selected time period. This information is sent to the pharmacy printer where a hard copy is generated. In most hospitals the drugs for a particular patient are hand-picked by either a pharmacist or a pharmacy technician and placed in the particular patient's designated box. A registered pharmacist must then check the accuracy of the patient order before it leaves the pharmacy. Individual patient boxes are then loaded into a medicine cart and delivered to the nursing unit.

Several companies have tried to automate this process through various approaches to the problem. Meditrol utilized a vending machine approach to dispense the unit dose medications. Each nursing unit must have its own stock of prescription drugs. Nurses key in a patient ID and the drugs for that patient are then dispensed from the vending machine. This system is very expensive because of the necessity of purchasing a machine for each nursing unit. Also, restocking each machine is a very time-consuming task. Implementation of this system requires a complete modification of the current drug dispensing process which many hospitals are reticent to undertake. Consequently, the Meditrol system provides no labor-saving advantages over the conventional manual approach. This system is described in U.S. Pat. No. 3,917,045 titled "Drug Dispensing Apparatus" and dated Nov. 11, 1975.

U.S. Pat. No. 5,468,110, assigned to the assignee hereof, discloses an "Automated System For Selecting Packages From A Storage Area." This system is particularly useful for filling patient medication orders in a hospital pharmacy. In this system unit dose packages are held on storage racks. Preferably, the storage racks contain a vertical array of storage rods, each storage rod having a unique x, y, z coordinate position. The items are arranged so that each storage rod contains like items. Additionally, a supply rack or a designated portion of the main storage rack is provided for receipt of new or returned items to be restocked. An automated picker selects individual unit dose packages from the storage rods as well as restocks the storage rack from replacement packages that have been placed in a supply rack. The automated picker includes a gripper assembly mounted on a transport vehicle which moves along a column and a track. The automated picker has a movable rod or other carrier for holding selected items, at least one vacuum head, and associated controls for gripping and moving selected items. To fill orders the picker selects the prescribed unit dose packages one at a time from the storage rods and deposits them in a patient box that has been placed on a conveyor by a technician or pharmacist. The contents of the patient box are checked and the box is then delivered to the nursing unit, typically in a nursing cart which contains patient boxes for all the patients in the nursing unit. In this system all packages are individually selected in the same manner.

More unit doses of some medications are prescribed for individual patients and many of those medicines are requested on a far more frequent basis than others. An automated pharmacy of the type described in the '110 patent would be more efficient if these medicines were dispensed into the patient boxes more rapidly than the picker operates. This is especially true in a hospital pharmacy where particular medications are frequently prescribed to a high percentage of patients. Thus, there is a need for a dispensing device that can rapidly dispense frequently prescribed unit dose packages into patient boxes. This device should be suitable for use in combination with the automated package selecting and storing system of the type described in the '110 patent. Preferably, the dispenser will handle blister packages of the type used for unit dose packs.

SUMMARY OF THE INVENTION

We provide a package dispenser which dispenses blister packages, boxes or similar containers. Several dispensers may be utilized simultaneously with an automated picker as part of a larger automated selecting and storing system similar to the "Automated System For Selecting Packages From A Storage Area" described above. Alternatively, a plurality of dispensers could be arranged parallel to each other in a stand-alone system.

The dispenser of the present invention includes a tubular magazine having a dispensing end in communication with a conveyor such that the dispensed packages may be delivered to containers carried by the conveyor, and a loading end into which the packages to be dispensed are loaded. The dispenser may be filled by an automated picker or may be manually loaded. The magazine is sized and configured to hold a plurality of packages and is provided with package guides to keep the packages oriented transverse to the tubular magazine and parallel to each other.

Other details and advantages of the apparatus and system will become apparent from the description of the preferred embodiments shown in the drawings.

BRIEF DESCRIPTION OF THE DRAWINGS

The invention will be more readily apparent to those skilled in the art by reference to the accompanying drawings wherein.

DETAILED DESCRIPTION OF THE PREFERRED EMBODIMENTS

Figure 1:
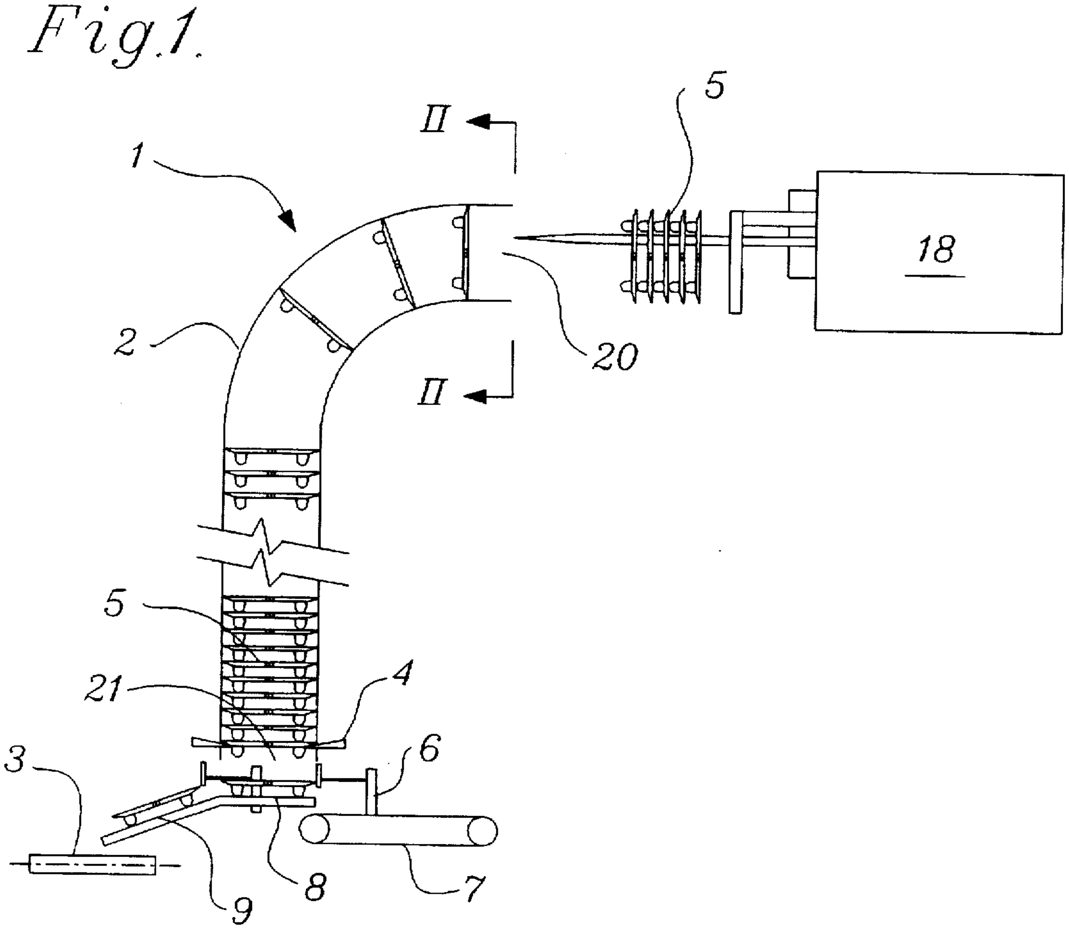
FIG. 1 is a side view of a present preferred embodiment of our package dispenser.
Figure 2:
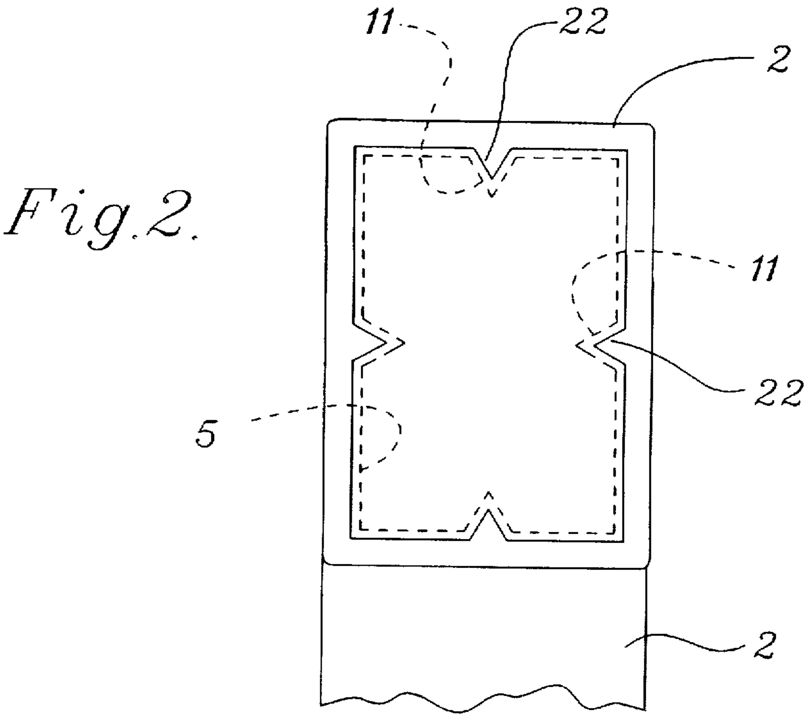
FIG. 2 is a end view of the loading end of the dispenser taken along the line II—II in FIG. 1.

The present preferred package dispenser 1, shown in FIGS. 1 and 2, has a tubular magazine 2, preferably having a rectangular cross-section which is sized and configured to hold a plurality of rectangular packages 5. The packages shown in FIG. 1 are blister packages but boxes, clamshell packages and other flat sided containers could be handled by the dispenser. The tubular magazine 2 extends upwardly from the dispensing end 21 for a length sufficient to hold a plurality of packages 5 and then gently curves ninety degrees and terminates at loading end 20. Preferably the dispenser is sized and positioned to be conveniently loaded by an automated picker 18 of the type disclosed in the '110 patent. However, the tubular magazine may also be loaded manually by a person. The dispensing end 21 has a releasable retainer 4 which prevents the packages 5 from falling out of the dispenser 1 prematurely. When the retainer 4 is retracted a package falls onto platform 8. A pusher rod 6 riding on belt 7 is moved across platform 8 pushing the package onto ramp 9. The package slides down ramp 9 onto a transfer conveyor 3 or into a container for delivery to a desired location. The pusher drive is computer controlled and can be designed to dispense packages while the automated picker is selecting packages. This increases the overall speed of the automated system. This dispensing rate is significantly faster than the time it would take for a robot of the type disclosed in the '110 patent to deliver the same number of packages from storage rods to the transfer conveyor.

The loading end 20 of the tubular magazine 2 is sized to receive a package 5 having a shape corresponding to the cross-section of the tubular magazine. As shown by the package drawn in chain line in FIG. 2, the packages 5 are preferably provided with notches 11 in each side which mate with splines 22 on each interior side of the magazine. The splines 22 should run the length of the tubular magazine 2 from the loading end 20 to the dispensing end 21. Engagement of the splines 22 by the notches keeps the packages 5 properly oriented inside the tubular magazine 2 so that they may be stored and dispensed without difficulty. As the packages 5 move through the magazine 2 they will continue to be oriented transverse to the magazine and substantially parallel to one another.

Figure 3:
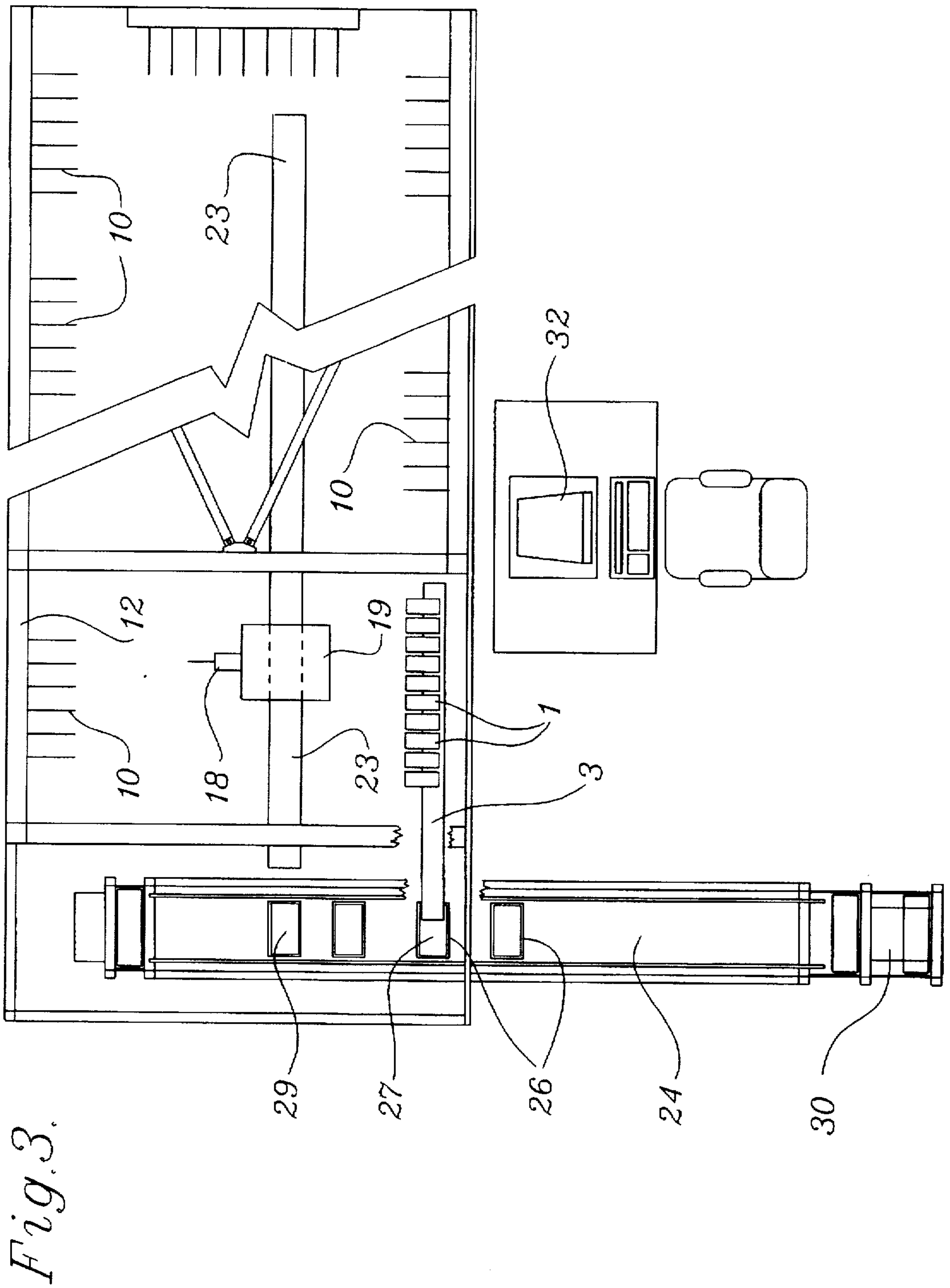
FIG. 3 is a schematic of a first present preferred storage and delivery system that utilizes multiple package dispensers in combination with an automated picker.

As shown in FIG. 3 multiple package dispensers 1 of the present invention preferably are used in an automated package selecting and storing system of the type disclosed in U.S. Pat. No. 5,468,110. In this system packages are stored on storage rods 10 which extend from storage racks 12. The stored packages are selected from and placed onto the storage rods 10 by the automated picker 18. The picker 18 is attached to a carrier 19 which travels on track 23. As explained in the '110 patent the picker can be extended outward from the carrier 19 to select from a storage rack 10 those packages required to fill an order. Containers 26 are provided on the main conveyor 24 to receive packages from the picker at position 29. Also provided are several dispensers 1 of the type shown in FIGS. 1 and 2. These dispensers 1 are positioned over transfer conveyor 3. Packages are dropped from selected dispensers 1 onto the transfer conveyor 3 which carries them to a container at position 27 on a main conveyor 24. The main conveyor 24 moves the containers 26 to position 29 where an automated picker 18 delivers the other packages required to fill the order to the container 26. The main conveyor 24 transports the filled container to position 30 where it is removed from the storage system. Thus, the automated picker 18 and package dispensers 1 work simultaneously to fill orders more quickly and efficiently than an automated picker 18 working alone. Occasionally, the automated picker 18 will retrieve several packages from a supply rack and refill a package dispenser 1. A second transfer conveyor with associated dispensers could be provided if desired. This second line could be located on the opposite side of the picker 18 replacing a portion of the storage rack 12.

The automated picker 18, dispensers 1 and conveyors are all controlled by a computer 32 to select packages 5 from the storage racks 12 and the package dispensers 1. The computer also directs the automated picker 18 to refill the dispensers 1 with packages selected from a supply rack 28.

Although the preferred system for using the dispensers is shown in FIG. 3 those skilled in the art will recognize that the package dispensers 1 can be used separate from a picker as described in the discussion of FIG. 3. One such system would include several package dispensers and transfer conveyor arranged like dispensers 1 and transfer conveyor 3 in FIG. 3. Another system may have two or more lines of dispensers with a transfer conveyor.

While specific embodiments of the invention have been described in detail, it will be appreciated by those skilled in the art that various modifications and alternatives to those details could be developed in light of the overall teachings of the disclosure. Accordingly, the particular system and apparatus disclosed herein are intended to be illustrative only and not limiting to the scope of the invention which should be awarded the full breadth of the following claims and any and all embodiments thereof.

We claim:

1. A package dispenser for dispensing packages which have a card portion that has a plurality of edges and a groove cut in one of the edges comprising:

a) a tubular magazine having a loading end and a dispensing end; said loading end sized and positioned to receive and hold a plurality of the packages, the tubular magazine having a transverse cross sectional shape corresponding to the card portion of the packages, said tubular magazine extending upwards from said dispensing end and gently curving ninety degrees at said loading end to form a J-shape, said tubular magazine further having at least one package guide on an inside surface of said tubular magazine which mates with the groove cut in the card portion such that any packages inside said tubular magazine are held substantially parallel to each other; and b) a release mechanism at said dispensing end to retain said packages in said magazine until they are to be released.

2. The package dispenser of claim 1 further comprising a package feeder in communication with said release mechanism, so that said feeder may direct a released package to a desired location.

3. The package dispenser of claim 1 also comprising a platform below the dispensing end and a pusher drive adjacent the platform for pushing packages from the platform.

4. The package dispenser of claim 1 wherein said loading end is sized and configured to receive packages from at least one of an automated picker and a person.

5. The package dispenser of claim 1 wherein said package is a blister package.

6. The package dispenser of claim 5 wherein said tubular magazine and said blister package are rectangular shaped, wherein said at least one guide is provided on each side of said rectangular shaped tubular magazine, and wherein said at least one groove is provided in each side of said rectangular shaped blister package, such that each said guide mates with each said groove to hold the blister packages parallel to each other in said tubular magazine.

7. The package dispenser of claim 1 wherein said package is a blister package having at least one additional groove provided on at least one other edge such that said at least one package guide mates with said at least one additional groove to hold said blister packages parallel to each other inside said tubular magazine.

8. The package dispenser of claim 1 wherein said at least one package guide is a spline.

9. An automated system for selecting and delivering packages comprising:

a) a storage area comprised of a plurality of storage area locations, each said location having package holders sized and configured to hold a plurality of packages in a manner such that each package can be placed into and removed from said locations, each said location identified by a distinct coordinate;

b) at least one package dispenser for dispensing packages which have a card portion that has a plurality of edges and a groove cut in one of the edges comprising a tubular magazine having a loading end and a dispensing end; said loading end sized and positioned to receive and hold a plurality of the packages, the tubular magazine having a transverse cross sectional shape corresponding to the card portion of the packages, said tubular magazine extending upwards from said dispensing end and gently curving ninety degrees at said loading end to form a J-shaped, said tubular magazine further having at least one package guide on an inside surface of the tubular magazine which mates with the groove cut in the card portion, such that any packages in said tubular magazine are held substantially parallel to each other, and a release mechanism at the dispensing end to retain said packages in said magazine until they are to be released;

c) an automated picker sized and configured to be able to hold said packages, select said packages from said storage area locations, place said packages in said storage area locations and in said loading end, and deliver said packages to a desired destination separate from said automated picker in accordance with computer controlled instructions, said automated picker having a gripper for grasping and moving said packages and having an automated picker storage holder sized and configured to hold a plurality of said packages in a face to face relationship after said packages have been retrieved from said storage area and prior to delivery of said packages to said desired destination;

d) means for moving said automated picker to selected said storage locations and said loading end; and e) a computer having at least one memory which contains a database containing a distinct coordinate location in said storage area for each said package held within said storage area and for said at least one loading end, said computer further having a program for directing said automated picker and said means for moving to selected coordinate locations and also for activating said release mechanism to release a package, said computer being connected to said automated picker, said means for moving said automated picker, and said release mechanism.

10. The system of claim 9 further comprising:

a) a main conveyor positioned accessible to said automated picker, said main conveyor having containers positioned thereon, said containers sized and positioned to receive said packages therein; and b) a transfer conveyor with one end in communication with said main conveyor and an opposite end positioned accessible to said dispensing end, such that said transfer conveyor may transport released packages from said dispensing end and deliver them into said containers on said main conveyor.

11. The system of claim 9 also comprising a platform below the dispensing end and a drive adjacent the platform for pushing packages from the platform.

12. The system of claim 9 wherein said package dispenser is sized and configured to be loaded manually by a person.

* * * * *